(12) United States Patent
McSherry et al.

(10) Patent No.: US 10,171,284 B2
(45) Date of Patent: *Jan. 1, 2019

(54) REACHABILITY-BASED COORDINATION FOR CYCLIC DATAFLOW

(71) Applicant: Microsoft Technology Licensing, LLC, Redmond, WA (US)

(72) Inventors: Frank D. McSherry, San Francisco, CA (US); Rebecca Isaacs, San Francisco, CA (US); Michael A. Isard, San Francisco, CA (US); Derek G. Murray, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,880

(22) Filed: Nov. 24, 2017

(65) Prior Publication Data

US 2018/0097684 A1    Apr. 5, 2018

Related U.S. Application Data

(63) Continuation of application No. 13/717,488, filed on Dec. 17, 2012, now Pat. No. 9,832,068.

(51) Int. Cl.
*H04L 29/08* (2006.01)
*G06F 9/48* (2006.01)
(Continued)

(52) U.S. Cl.
CPC ...... *H04L 29/08135* (2013.01); *G06F 9/4494* (2018.02); *G06F 9/4881* (2013.01); *G06F 17/30539* (2013.01)

(58) Field of Classification Search
USPC ................ 709/201, 200, 220, 217
See application file for complete search history.

(56) References Cited

U.S. PATENT DOCUMENTS 5,535,393 A    7/1996  Reeve et al.
6,058,385 A    5/2000  Koza et al.
(Continued)

OTHER PUBLICATIONS

"Apache Hadoop MapReduce", Retrieved From <<http://hadoop.apache.org/index.html>>, Dec. 17, 2012, 4 Pages.
(Continued)

*Primary Examiner* — El Hadji M Sall
(74) *Attorney, Agent, or Firm* — Harness, Dickey & Pierce, P.L.C.

(57) ABSTRACT

A computer-readable storage medium stores computer-executable instructions that, when executed by a processor, perform operations including scheduling first and second threads to operate independently on first and second partitions of data. The operations include beginning a first operation on the first and second partitions by the first and second threads, respectively. The operations include tracking progress of the first operation by the first and second threads using a replicated data structure. The operations include, for a record on which the first operation will be performed, adding an entry to the replicated data structure with a timestamp indicating an epoch and iteration. The operations include determining a number of yet-to-be-processed records for a selected entry of the replicated data structure. The selected entry has the most recent timestamp for the first thread. The operations include terminating the first thread when the number of yet-to-be-processed records for the selected entry is zero.

20 Claims, 10 Drawing Sheets

(51) Int. Cl.
   G06F 9/448    (2018.01)
   G06F 17/30    (2006.01)

(56) References Cited

U.S. PATENT DOCUMENTS

| | | | |
|---|---|---|---|
| 6,253,371 | B1 | 6/2001 | Iwasawa et al. |
| 6,370,685 | B1 | 4/2002 | Robison |
| 6,526,418 | B1* | 2/2003 | Midgley ............. G06F 11/1451 707/640 |
| 6,772,415 | B1 | 8/2004 | Danckaert et al. |
| 7,263,694 | B2 | 8/2007 | Clewis et al. |
| 7,415,716 | B2 | 8/2008 | Marin et al. |
| 8,141,049 | B2 | 3/2012 | Kahlon |
| 8,176,470 | B2 | 5/2012 | Klumpp et al. |
| 2002/0116356 | A1* | 8/2002 | Ieong ................ G06F 17/30578 |
| 2005/0080715 | A1* | 4/2005 | McHale ............. G06Q 30/0601 705/37 |
| 2005/0114842 | A1 | 5/2005 | Fleehart et al. |
| 2006/0277391 | A1 | 12/2006 | Bittner, Jr. |
| 2007/0185938 | A1 | 8/2007 | Prahlad et al. |
| 2009/0083722 | A1 | 3/2009 | Eichenberger et al. |
| 2009/0225082 | A1 | 9/2009 | Hargrove et al. |
| 2009/0300150 | A1 | 12/2009 | Rudy et al. |
| 2010/0088490 | A1 | 4/2010 | Chakradhar et al. |
| 2010/0121935 | A1* | 5/2010 | Holt .................... G06F 12/0284 709/215 |
| 2011/0276962 | A1 | 11/2011 | Chambers et al. |
| 2011/0314444 | A1 | 12/2011 | Zhang et al. |
| 2012/0185449 | A1 | 7/2012 | Gould et al. |
| 2012/0254597 | A1 | 10/2012 | Delling et al. |
| 2013/0067443 | A1 | 3/2013 | Howard |
| 2013/0304744 | A1 | 11/2013 | McSherry et al. |

OTHER PUBLICATIONS

"PrIter Distributed Computing Framework for Prioritized Iteration", Retrieved from <<http://code.google.com/p/priter/>>, Nov. 23, 2012, 3 Pages.
"Final Office Action Issued in U.S Appl. No. 13/468,726", dated Oct. 27, 2014, 5 Pages.
"Non-Final Office Action Issued in U.S Appl. No. 13/468,726", dated Feb. 24, 2015, 5 Pages.
"Non-Final Office Action Issued in U.S Appl. No. 13/468,726", dated Dec. 27, 2013, 11 Pages.
"Non-Final Office Action Issued in U.S Appl. No. 13/468,726", dated Jun. 13, 2014, 8 Pages.
"Non-Final Office Action Issued in U.S Appl. No. 13/717,488", dated Nov. 30, 2015, 13 Pages.
"Non-Final Office Action Issued in U.S Appl. No. 13/717,488", dated Jun. 16, 2016, 16 Pages.
"Notice of Allowance Issued in U.S Appl. No. 13/717,488", dated Jul. 28, 2017, 7 Pages.
Zhang, et al., "iMapReduce: A Distributed Computing Framework for Iterative Computation", In Journal of Grid Computing, vol. 10, Issue 1, Mar. 2012, 10 pages.
Acar, Umut A., "Self-Adjusting Computation", Submitted in partial fulfillment of the requirements for the degree of Doctor of Philosophy, 2005, 75 Pages.
Alvaro, et al., "Consistency Analysis in Bloom: a CALM and Collected Approach", Retrieved From <<http://db.cs.berkeley.edu/papers/cidr11-bloom.pdf>>, Jan. 9, 2011, 12 Pages.
Arvind, et al., "Executing a Program on the MIT Tagged-Token Dataflow Architecture", In Proceedings of the IEEE Transactions on Computers, vol. 39 Issue 3, Mar. 1990, 47 Pages.
Baden, et al., "Lattice parallelism: A Parallel Programming Model for Manipulating Non-Uniform Structured Scientific Data Structures", In CSE Technical Report No. CS92-261, Dept of Computer Science and Engineering, Sep. 1992, 22 Pages.
Barga, et al., "Consistent Streaming Through Time: A Vision for Event Stream Processing", In Proceedings of the 3rd Biennial Conference on Innovative Data Systems Research, Jan. 10, 2007, 12 Pages.
Bhatotia, et al., "Incoop: MapReduce for Incremental Computations", In Proceedings of the 2nd ACM Symposium on Cloud Computing, Oct. 27, 2011, 14 Pages.
Bierman, et al., "Lost in Translation: Formalizing Proposed Extensions to C#", In Proceedings of the 22nd annual ACM SIGPLAN conference on Object-oriented programming systems and applications, Oct. 21, 2007, 20 Pages.
Blelloch, Guy E., Programming Parallel Algorithms, Communications of the ACM, vol. 39, No. 3, Mar. 1996, pp. 85-97.
Bu, et al., "HaLoop: Efficient Iterative Data Processing on Large Clusters", In Proceedings of the VLDB Endowment, vol. 3, Issue 1-2, Sep. 2010, 14 Pages.
Chambers, et al., "FlumeJava: Easy, Efficient Data-Parallel Pipelines", In Proceedings of the 31st ACM SIGPLAN conference on Programming Language Design and Implementation, Jun. 5, 2010, pp. 363-375.
Chandramouli, et al., "On-the-Fly Progress Detection in Iterative Stream Queries", In Journal of Proceedings of the VLDB Endowment, vol. 2 Issue 1, Aug. 1, 2009, 12 Pages.
Cheng, et al., "Kineograph: Taking the Pulse of a Fast-Changing and Connected World", In Proceedings of the 7th ACM european conference on Computer Systems, Apr. 10, 2012, pp. 85-98.
Condie, et al., "Map Reduce Online", In Proceedings of the 7th USENIX conference on Networked systems design and implementation, Apr. 28, 2010, 15 Pages.
Davis, et al., "Data Flow Program Graphs", Published in Journal of Computer, vol. 15 Issue 2, Feb. 1982, pp. 28-43.
Dean, et al., "Mapreduce: Simplified Data Processing on Large Clusters", In Proceedings of the USENIX Association 6th Symposium on Operating Systems Design and Implementation, Dec. 6, 2004, pp. 137-149.
Dijkstra, et al., "Termination Detection for Diffusing Computations", In Information Processing Letters, vol. 11, Issue 1, Aug. 29, 1980, 9 pages.
Ekanayake, et al., "Twister: A Runtime for Iterative MapReduce", In Proceedings of the 19th ACM International Symposium on High Performance Distributed Computing, Jun. 21, 2010, 9 pages.
Fidge, Colin J., "Timestamps in Message-Passing Systems That Preserve the Partial Ordering", In Proceedings of the 11th Australian Computer Science Conference, vol. 10, Issue 1, Feb. 1988, pp. 56-66.
Gedik, et al., "SPADE: The System S Declarative Stream Processing Engine", In Proceedings of the 2008 ACM SIGMOD international conference on Management of data, Jun. 9, 2008, pp. 1123-1134.
Gunda, et al., "Nectar: Automatic Management of Data and Computation in Datacenters", In Proceedings of the 9th USENIX conference on Operating systems design and implementation, Oct. 4, 2010, pp. 75-88.
Isard, Michael, "Dryad: Distributed Data-Parallel Programs from Sequential Building Blocks", In Proceedings of the 2nd ACM SIGOPS/EuroSys European Conference on Computer Systems, Mar. 21, 2007, 14 Pages.
Kumar, et al., "Structure and Evolution of Online Social Networks", In Proceedings of the 12th ACM SIGKDD International conference on Knowledge discovery and data mining, Aug. 20, 2006, pp. 611-617.
Lee, et al., "Sychronous Data Flow", In Proceedings of the IEEE Magazine, vol. 75, Issue 9, Sep. 1987, pp. 1235-1245.
Leskovec, et al., "The Dynamics of Viral Marketing", In Proceedings of the ACM Transactions on the Web, vol. 1 Issue 1, May 2007, 12 Pages.
Logothetis, et al., "Stateful Bulk Processing for Incremental Analytics", In Proceedings of the 1st ACM Symposium on Cloud Computing, Jun. 10, 2010, 12 Pages.
Mahajan, et al., "Analyzing the MAC-level Behavior of Wireless Networks in the Wild", In Proceedings of the 2006 conference on Applications, technologies, architectures, and protocols for computer communications, Sep. 11, 2006, pp. 75-86.
Malewicz, et al., "Pregel: A System for Large-scale Graph Processing", In Proceedings of the ACM SIGMOD International Conference on Management of data, Jun. 6, 2010, pp. 135-146.

(56) References Cited

OTHER PUBLICATIONS

Mattern, Friedemann, "Virtual Time and Global States of Distributed Systems", In Proceedings of the International Workshop on Parallel and Distributed Algorithms, Oct. 1988, 15 Pages.

McSherry, Frank, "A Uniform Approach to Accelerated PageRank Computation", In Proceedings of the 14th International conference on World Wide Web, May 10, 2005, pp. 575-582.

McSherry, et al., "Composable Incremental and Iterative Data-Parallel Computation with Naiad", Published in Microsoft Research, TechReport, MSR-TR-2012-105, Oct. 9, 2012, 20 Pages.

McSherry, et al., "Differential Dataflow", In Proceedings of the 6th Biennial Conference on Innovative Data Systems Research, Jan. 6, 2012, 12 Pages.

McSherry, et al., "Naiad: The Animating Spirit of Rivers and Streams", Retrieved From <<http://sigops.org/sosp/sosp11/posters/summaries/sosp11-final14.pdf>>, Aug. 2011, 2 Pages.

Misra, et al., "Termination Detection of Diffusing Computations in Communicating Sequential Processes", In Proceedings of the ACM Transactions on Programming Languages and Systems, vol. 4 Issue 1, Jan. 1982, 16 Pages.

Murray, et al., "CIEL: A Universal Execution Engine for Distributed Data-Flow Computing", In Proceedings of the 8th USENIX conference on Networked systems design and implementation, Mar. 30, 2011, 14 Pages.

Murray, et al., "Naiad: A Timely Dataflow System", In Proceedings of the 24th ACM Symposium on Operating Systems Principles, Jan. 1, 2013, pp. 439-455.

Murray, et al., "Scripting the Cloud with Skywriting", In Proceedings of the 2nd USENIX conference on Hot topics in cloud computing, Jun. 22, 2010, 7 Pages.

Najork, et al., "Of Hammers and Nails: An Empirical Comparison of Three Paradigms for Processing Large Graphs", In Proceedings of the 5th ACM International Conference on Web Search and Data Mining, Feb. 1, 2012, pp. 103-112.

Najork, Marc, "The Scalable Hyperlink Store", In Proceedings of the 20th ACM conference on Hypertext and hypermedia, Jun. 1, 2009, pp. 89-98.

Olston, et al., "Generating Example Data for Dataflow Programs", In Proceedings of the 2009 ACM SIGMOD International Conference on Management of data, Jun. 29, 2009, 12 Pages.

Olston, et al., "Pig Latin: A Not-So-Foreign Language for Data Processing", In Proceedings of the ACM SIGMOD International Conference on Management of Data, Jun. 9, 2008, pp. 1099-1110.

Zhang, et al., "Priter: A Distributed Framework for Prioritized Iterative Computations", In Proceedings of IEEE Transactions on Parallel and Distributed Systems, Oct. 27, 2011, 14 Pages.

"International Search Report and Written Opinion Issued in PCT Application No. PCT/US2013/075790", dated Apr. 25, 2014, 15 Pages.

"Second Written Opinion Issued in PCT Application No. PCT/US2013/075790", dated Oct. 10, 2014, 7 Pages.

Peng, et al., "Large-scale Incremental Processing Using Distributed Transactions and Notifications", In Proceedings of the 9th USENIX Symposium on Operating Systems Design and Implementation, Oct. 4, 2010, 14 Pages.

Power, et al., "Piccolo: Building Fast, Distributed Programs with Partitioned Tables", In Proceedings of the 9th USENIX conference on Operating Systems Design and Implementation, Oct. 2010, 14 Pages.

Ranger, et al., "Evaluating MapReduce for Multi-Core and Multi-processor Systems", In Proceedings of the 2007 IEEE 13th International Symposium on High Performance Computer Architecture, Feb. 10, 2007, 12 Pages.

Singh, et al., "Automated Worm Fingerprinting", In Proceedings of the 6th conference on Symposium on Opearting Systems Design & Implementation—vol. 6, Dec. 6, 2004, 16 Pages.

Stone, et al., "Automatic Determination of May/Must Set Usage in Data-Flow Analysis", In Proceedings of the IEEE International Working Conference on Source Code Analysis and Manipulation, Sep. 28, 2008, pp. 153-162.

Thies, et al., "StreaMIT: A language for Streaming Applications", In Proceedings of the 11th International Conference on Compiler Construction, Apr. 8, 2002, 17 Pages.

Tucker, et al., "Exploiting Punctuation Semantics in Continuous Data Streams", In Proceedings of the IEEE Transactions on Knowledge and Data Engineering, vol. 15, Issue 3, May 13, 2003, pp. 555-568.

Yu, et al., "DryadLINQ: A System for General-Purpose Distributed Data-Parallel Computing Using a High-Level Language", In Proceedings of the 8th USENIX Conference on Operating Systems Design and Implementation, vol. 8, Dec. 8, 2008, 14 Pages.

Zaharia, et al., "Resilient Distributed Datasets: A Fault-Tolerant Abstraction for In-Memory Cluster Computing", In Proceedings of the 9th USENIX Conference on Networked Systems Design and Implementation, Apr. 25, 2012, 14 Pages.

"International Preliminary Report on Patentability Issued in PCT Application No. PCT/US2013/075790", dated Jan. 7, 2015, 9 Pages.

"First Office Action and Search Report Issued in Chinese Patent Application No. 201380066229.9", dated Nov. 30, 2017, 15 Pages.

"Office Action Issued in European Patent Application No. 13821555.3", dated Mar. 28, 2018, 3 Pages.

"Second Office Action Issued in Chinese Patent Application No. 201380066229.9", dated Jul. 23, 2018, 6 Pages.

* cited by examiner

```
void Main(string[] args) {
    // create a new input collection.
    var edges = new InputCollection<Edge>();
    // prepare connected components dataflow from the input,
    // register interest in the output by way of a callback.
    ConnectedComponents(edges).Subscribe(x =>
PrintOutput(x));
    // start feeding edges in to the dataflow,
    // callback fires for each complete epoch.
    while (true) {
        var diffs = ... /* obtain set of edges to add or remove */
        edges.OnNext(diffs);
    }
}
// produces an (id, label) pair for each node in the graph.
Collection<Node> ConnectedComponents(Collection<Edge> edges)
{
    // start each node with its own label, then iterate.
    return edges.Select(x => new Node(x.srcId,x.srcId))
        .Distinct()
        .FixedPoint(x => LocalMin(x, edges));
}
// improves an input labeling of nodes by considering the
// labels available on neighbors of each node as well.
Collection<Node> LocalMin(Collection<Node> nodes,
                Collection<Edge> edges) {
    return nodes.Join(edges,
            node => node.id,
            edge => edge.srcId,
            (node, edge) => new Node(edge.dstId,
                            node.label))
        .Concat(nodes)
        .Min(node => node.id, node => node.label);
}
```

FIG. 2

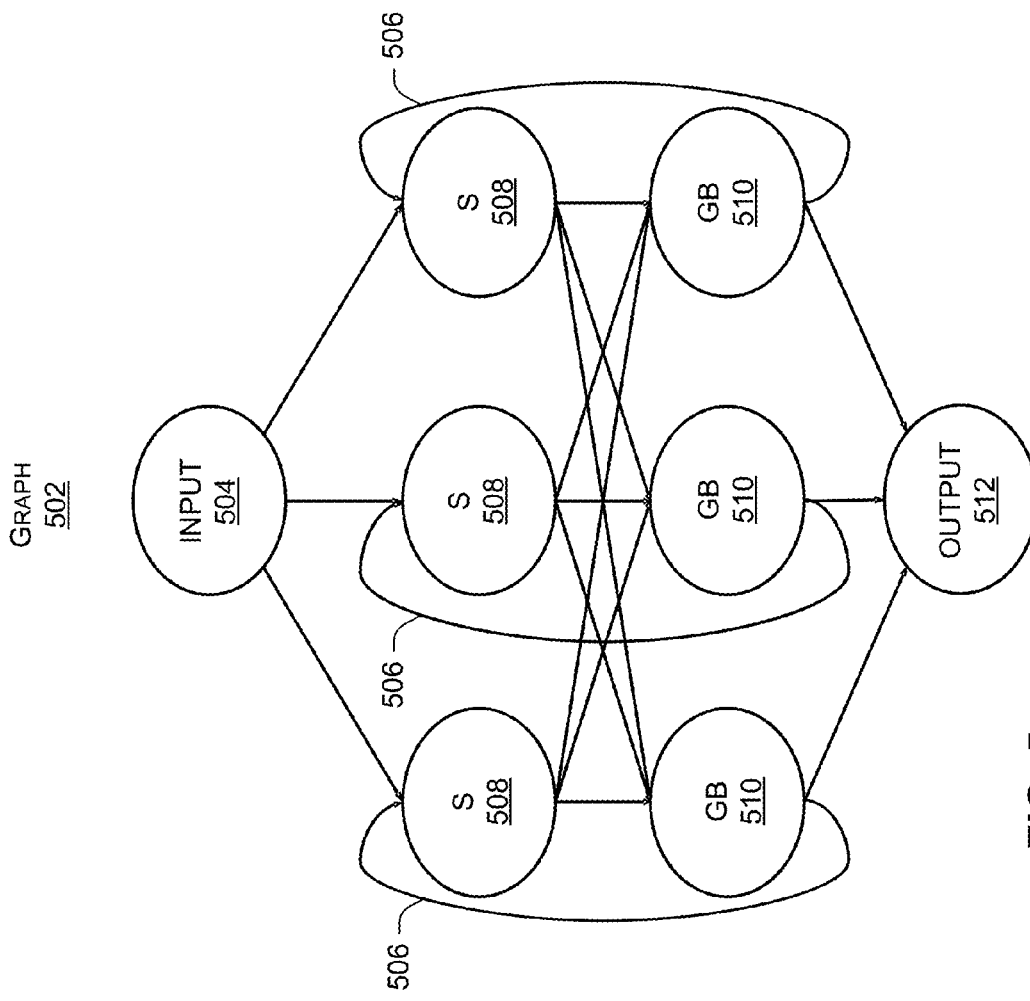

US 10,171,284 B2

REACHABILITY-BASED COORDINATION FOR CYCLIC DATAFLOW

CROSS-REFERENCE TO RELATED APPLICATIONS

The present application is a continuation of U.S. patent application Ser. No. 13/717,488 filed Dec. 17, 2012 (now U.S. Pat. No. 9,832,068). The entire disclosure of the application referenced above is incorporated by reference.

BACKGROUND

Most dataflow computations are acyclic, meaning that the operators in the graph can be sequenced in a linear order so that the inputs of each operator come from the outputs of "previous" operators. Acyclic graphs are relatively easy to schedule, because running the operators in the linear order ensures all operators have their input available. Cyclic graphs, on the other hand, are hard to schedule because there need not be an order on the vertices ensuring that their inputs are fully formed before the operator runs; such graphs typically require problem-dependent knowledge to schedule effectively.

In typical incremental dataflow systems, the incremental dataflow system is optimized to deal with small changes to the input. Thus, for each change to the initial data, the incremental dataflow system processes each change to produce the output. Meanwhile, for typical iterative dataflow systems, the iterative dataflow system can take the output of incremental dataflow programs and feed it back to its input, to yield an efficient fixed-point loop. Eventually if it converges, the fed-back change to the input will make no change to the output, and the iterative dataflow system will terminate. However, conventionally incremental and iterative computations are incompatible when changes occur to input. In such scenarios, each change to the input requires reprocessing by the iterative dataflow system. That is, as a collection of data changes over time, conventional systems must rerun the program again from the start, regardless of whether the program is represented as a dataflow graph, executed in a data-parallel fashion, written declaratively, etc.

SUMMARY

The techniques discussed herein efficiently perform incremental, iterative, and interactive parallel computation, which applies to scheduling computation and managing resources such as memory and network resources, etc., in cyclic graphs including those resulting from a differential dataflow model that performs computations on differences in the collections of data. The techniques discussed herein work in a distributed setting using a coordination clock protocol.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs)), and/or technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 is an example program to compute connected components of a graph with reachability-based coordination for cyclic dataflow, according to at least one embodiment.

FIG. 5 is a diagram depicting an example program for use with reachability-based coordination for cyclic dataflow, according to some embodiments.

DETAILED DESCRIPTION

Overview

Figure 1:
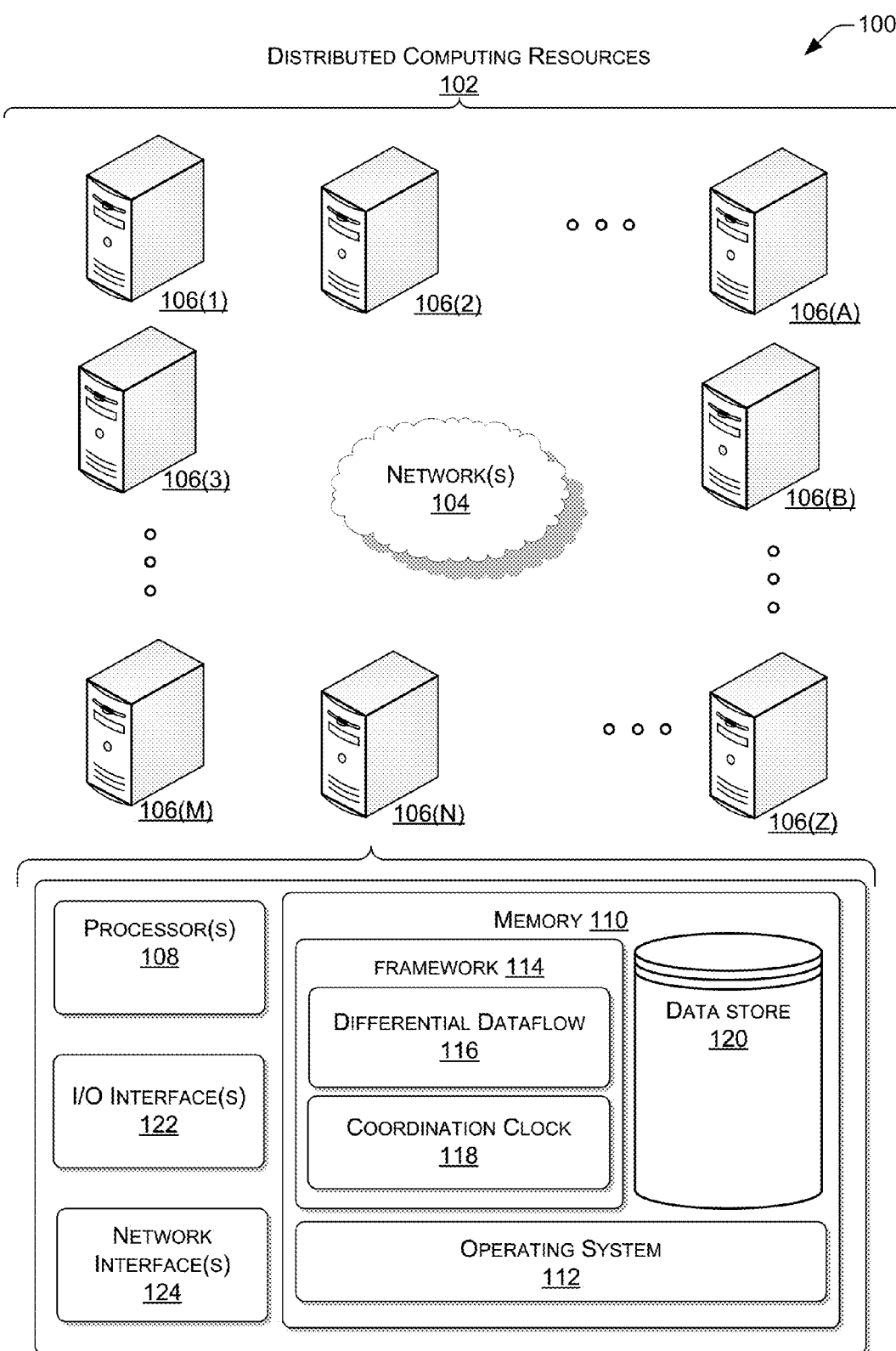
FIG. 1 is a block diagram depicting an example environment in which embodiments of reachability-based coordination for cyclic dataflow can operate.

Embodiments provide techniques applicable to solve at least three types of problems encountered in distributed iterative computation. As described further herein, embodiments provide a protocol by which a service: 1) can detect distributed termination, 2) can control resource scheduling, and 3) can control garbage collection and/or compaction. Accordingly, in at least one embodiment, the reachability-based coordination for cyclic dataflow is implemented in a single-machine/multi-processor environment. Meanwhile, in at least one embodiment, the reachability-based coordination for cyclic dataflow is implemented in a network-distributed environment. The network-distributed environment may include one or more types of computing resources, which types of computing resources may include computing, networking and/or storage devices. A network-distributed environment may also be referred to as a cloud-computing environment.

Reachability-based coordination for cyclic dataflow supports efficient incremental and iterative data-parallel computation implementing a differential dataflow model. Various implementations employ a decentralized coordination clock protocol by which distributed processors can efficiently track progress of global computation through a cyclic dataflow graph. This progress information allows the processors to make effective local scheduling decisions, reclaim memory by compacting updates, and process multiple epochs of the input data concurrently without conflating the results.

The reachability-based coordination for cyclic dataflow techniques are capable of processing data efficiently, including for either non-iterative or complex iterative algorithms, which can be programmed to automatically update as new inputs arrived in a scalable distributed implementation. Reachability-based coordination for cyclic dataflow effectively performs processing tasks that are incremental and/or batch iterative. The techniques described herein can compute and incrementally update the outputs of analyses like strongly connected components which include multiple nested loops. These techniques attain sub-second update latency for these tasks over real world input streams using clusters of processors.

Computations on large-scale collections of data pertaining to real world systems, such as a social network system or a roadmap/GPS system, can be modeled as dataflow graphs. In various implementations, the reachability-based coordination for cyclic dataflow techniques described herein include the following approaches, dataflow graphing, declarative programming, and data-parallelism while dealing with data that changes over time.

Dataflow graph representation of a program is one way to effect concurrency and pipelining. Because the output of one function (e.g., a dataflow vertex) is the input of the next, both vertices can execute concurrently, with the downstream vertex processing inputs as soon as they are produced by the upstream vertex. Declarative computer programming is another approach for dataflow-style execution that can be employed by a computer programmer to specify dependencies between operators for clear mapping from the program into a dataflow graph. Data-parallelism is another approach that provides a way of running multiple copies of each vertex in the dataflow graph in parallel. For suitable algorithms it is possible to slice up the data into partitions so each parallel vertex instance can process its own partition independently. Accordingly, reachability-based coordination for cyclic dataflow techniques as described herein can include modeling computation as a dataflow graph, using a declarative programming language to write the program for computation, and parallelizing the computation with data-parallelism, as well as manage collections of data pertaining to real world systems that change over time.

The techniques described herein implement a scalable distributed execution platform capable of incrementally updating large-scale data-parallel computations that include arbitrarily nested iteration. For example, in real-time, the techniques are able to compute and maintain the connected component structure of TWITTER's messaging graph, as derived from a 24-hour sliding window, over continuously arriving tweets. The system employs a differential dataflow computational model, via a scalable distributed implementation based on dataflow over possibly-cyclic graphs whose vertices represent operations on versioned collections. In contrast to existing batch systems, in which each vertex is expected to run for seconds or minutes, the described techniques employ a finer-grain communication and coordination technique in which many vertices are expected to run for milliseconds and some not at all. The techniques described herein engineer a substantial reduction in the overhead of coordination while maintaining accurate distributed state information. The state information includes which vertex in the dataflow graph the system must schedule next. The system can perform work according to the schedule to benefit system performance from the multiple orders of magnitude reductions in vertex execution time. In some embodiments, the coordination clock can manage computation where a dataflow graph can be composed vertices that are not "operators" in a functional, data-parallel sense.

The described framework and distributed protocol summarize the progress of a differential dataflow computation in a manner that enables independent processors to make effective local decisions about scheduling and resource management. In various implementations, the structure of differential dataflow graphs order dependencies between different vertex versions allowing the system to determine which versions may still receive updates. A lightweight non-blocking protocol allows the processors to exchange minimal amounts of information about processing actions in order to keep the other processors in the system current about the outstanding updates in the system. The differential dataflow approach employed makes fine-grain vertex invocations with small sets of input records. In this way, the system exhibits the high throughput of batch processors, while responding to changes in inputs and propagating updates between processors with the low latency normally associated with stream processors. Various embodiments are described further with reference to FIGS. 1-8.

Illustrative Environment

FIG. 1 shows an example environment 100 in which embodiments of reachability-based coordination for cyclic dataflow can operate. In some embodiments, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some embodiments, network(s) 104 can further include devices that enable connection to a wireless network, such as a wireless access point (WAP). Embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various embodiments, distributed computing resources 102 include devices 106(1)-106(Z). Embodiments support scenarios where device(s) 106 can include one or more computing devices that operate in a cluster or other grouped configuration to share resources, balance load, increase performance, provide fail-over support or redundancy, or for other purposes. Although illustrated as a desktop computer, device(s) 106 can include a diverse variety of device types and are not limited to any particular type of device. Device (s) 106 can include any type of computing device with one or multiple processor(s) 108 operably connected to memory 110. Device(s) 106 can include but are not limited to desktop computers, server computers, personal computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of processing device.

In some embodiments, as shown regarding device 106(N), memory 110 can store instructions executable by the processor(s) 108 including an operating system 112, a framework for reachability-based coordination for cyclic dataflow 114, and other modules, programs, or applications that are loadable and executable by processor(s) 108. Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In various embodiments, the framework for reachability-based coordination for cyclic dataflow 114 includes a differential dataflow protocol 116 and a coordination clock protocol 118 as well as potentially other tools. The memory 110 is an example of computer-readable storage media and may include volatile memory, nonvolatile memory, and/or other persistent and/or auxiliary computer-readable storage media. Thus, the memory 110 includes tangible and/or physical forms of media included in a device and/or hardware component that is part of a device or external to a device, including but not limited to random-access memory (RAM), static random-access memory (SRAM), dynamic random-access memory (DRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. However, memory 110 and the described computer-readable storage media encompassed thereby does not include communications media consisting solely of propagated signals, per se.

Although FIG. 1 depicts differential dataflow protocol 116 and coordination clock 118 as part of the framework for reachability-based coordination for cyclic dataflow 114, embodiments are not so limited and in some cases the differential dataflow protocol 116 or coordination clock 118 can operate as a separate module in communication with or accessing common data with the framework 114.

In the illustrated embodiment, memory 110 includes a data store 120, such as a database, data warehouse, or other type of structured or unstructured data storage. In some embodiments, data store 120 includes a relational database with one or more tables, indices, stored procedures, and so forth to enable data access. Data store 120 can store data for the operations of processes, applications, components, and/or modules stored in memory 110 and/or executed by processor(s) 108. For example, data store 120 can store version data, iteration data, clock data, and other state data stored and accessible by the framework 114.

Device(s) 106 can further include one or more input/output (I/O) interfaces 122 to allow device 106 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Device 106 can also include one or more network interfaces 124 to enable communications between computing device 106 and other networked devices such as other device(s) 106 over network(s) 104. Such network interface(s) 124 can include one or more network interface controllers (NICs) or other types of transceiver devices to send and receive communications over a network.

Illustrative Dataflow

Co-pending and commonly assigned application Ser. No. 13/468,726, entitled "Differential Dataflow," which is incorporated herein by reference, explains an implementation of the reachability-based coordination for cyclic dataflow incremental operators, describing their internal state and the rules for computing outputs from inputs.

FIG. 2 provides an example program to compute connected components of a graph. As FIG. 2 illustrates, such programs can be written using a declarative style, but the system is not so limited.

As shown in FIG. 2, an employed data abstraction is a strongly typed multi-set of records called a collection. Collections support a variety of declarative data-parallel operations such as Select, Join, and GroupBy. To perform one of these operations, a dataflow operator is applied to one or more collections, which produces a new collection that is the result of performing that operation. Starting from input collections, subsequent application of these operators results in a dataflow graph. Any collection may be observed by registering a callback (PrintOutput in FIG. 2) capable of responding to changes in the collection. The programmer updates an input collection by calling its OnNext operation to add or subtract arbitrary multi-sets of records, and the system propagates their consequences through the dataflow graph, ensuring that all collections (and callbacks) reflect the modified inputs. Each set of updates passed to OnNext is called an input epoch; OnNext is non-blocking so the programmer can introduce overlapping epochs of work.

Reachability-based coordination for cyclic dataflow invokes each output callback in epoch order, once the set of resulting changes to the output collection is available. Considering the code in FIG. 2 in more detail, the LocalMin method takes as input two collections of types Node and Edge respectively. It first joins the two, using the node's name (node.id) and the edge's source (edge.srcId) as the respective keys, to propagate labels in the first collection along edges in the second collection. The resulting propagated labels are combined with the original labels, and the minimum for each node is returned. The effect is to transform a labeling and graph into a new labeling where each node assumes the minimum value in its neighborhood. Note that Min is explicitly data-parallel and first groups its inputs according to a key, "id" in the illustrated example, then outputs one record per group, here corresponding to the record in the group with the minimal value of node.label. In the illustrated example, "id" is a property of each candidate label produced by Join, and it is an integer that uniquely identifies a vertex in the graph.

A significant language construct reachability-based coordination for cyclic dataflow introduces is a fixed-point operator on collections. The FixedPoint operator takes a function f mapping collections to collections of the same type, and results in the collection corresponding to an unbounded number of applications of f to the source collection. It produces a cyclic dataflow graph with the dataflow graph of the function f (which can include further, nested loops) used as the body of the cycle. The ConnectedComponents operation of FIG. 2 uses a FixedPoint around the LocalMin operation to repeatedly update the labels in the neighborhood of a node, flooding labels through the graph, and ultimately determining the connected components of a symmetric graph. If the input to a computation is a symmetric graph, that is if for every edge (u, v) in the input, it also contains (v, u), the result of this query will be a labeling where every vertex takes the smallest label of any vertex in its connected component.

Since the labels are propagated along directed edges, if the graph is not symmetric, each vertex will receive a label that is the ID of the smallest-ID vertex that can reach it by taking a directed path in the graph. This property is employed when computing the Strongly Connected Components (SCCs) of directed graphs.

Figure 3:
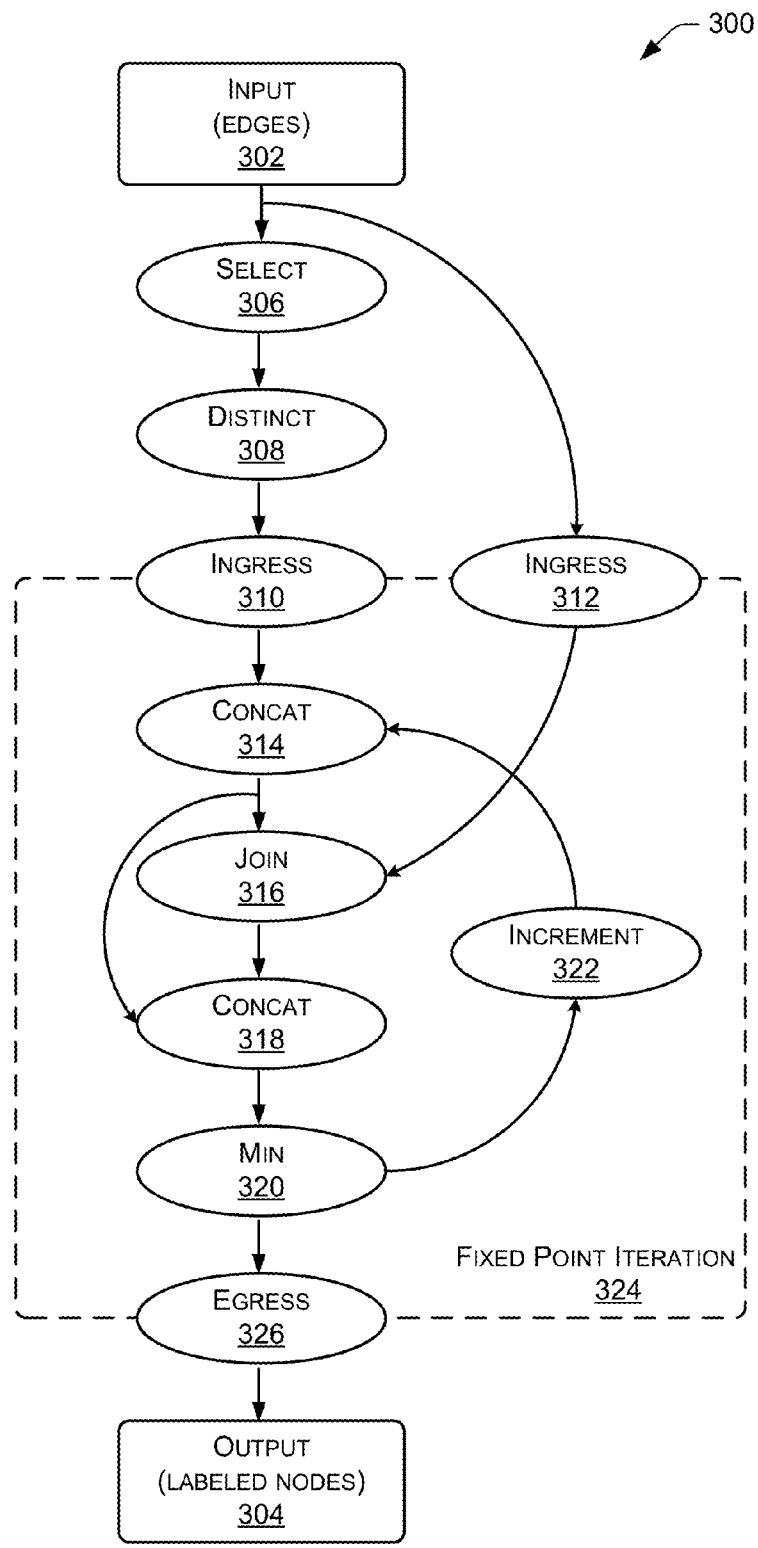
FIG. 3 is a dataflow graph illustrating an example process for executing connected components in accordance with reachability-based coordination for cyclic dataflow, according to various embodiments.

Meanwhile, FIG. 3 shows a representation of the example program of FIG. 2 as a differential dataflow graph 300. A differential dataflow program is structured as a directed graph whose vertices are operators. The graph may contain cycles corresponding to program loops as illustrated in FIG. 3. In order to keep track of the progress of the computation across input epochs and loop iterations, each vertex v has an associated domain $T_v$ of logical times. Logical times can be tuples of integers made up of an integer representing the epoch and an integer representing the iteration.

Conceptually vertex v "stores" a distinct collection corresponding to each of its input edges, for every distinct time in $T_v$. The large and often redundant amount of data represented by these collections is summarized and stored by the system as a set of differences, each of which is a tuple {r, δ, t} indicating a record r, an integer δ that can be a negative integer, and a logical time t. The differences are constructed so that the number of occurrences of a record r in the collection at time t is equal to the sum of its δ values in the differences at stored times s≤t. Note, that as used here, s≤t can represent a partially ordered set and need not represent a totally ordered set.

The computation unfolds through the circulation of updates to the differences associated with specific vertices, where an update is a set of differences all of which have the same time. In this discussion of FIG. 3, "edges" and "nodes" refer to collections of data records in the computation, whereas "inputs", "outputs" and "operators" correspond to the structure of the dataflow graph. During a "step" of computation a vertex consumes an update on its inputs 302, storing the differences contained in the update and modifying other internal state as necessary, and produces updates on its outputs 304, according to the operator's semantics. The computation continues as long as unprocessed updates remain in the system.

Various vertices, such as the illustrated select operation 306 and a distinction operation 308 can consume input 302 at a logical time outside of a cycle, although in other instances alternate and/or additional or fewer operations can consume input 302 at a logical time outside of a cycle. Differential dataflow graph 300 illustrates two loop ingress vertices 310 and 312 through which input enters the loop after any pre-loop operations such as selection 306 and distinction 308 have been performed.

A logical time is a tuple of integers, where the first integer indicates the epoch of input and each subsequent integer indicates the loop index of a progressively deeper-nested loop containing the vertex. For example in FIG. 3, times at all vertices have at least one coordinate (corresponding to the input epoch), and the vertices inside the loop (Concat 314, Join 316, Concat 318, Min 320, and Increment 322) have an additional time coordinate.

For example, three operators, which the system inserts in the dataflow graph to effect fixed-point iteration 324, modify the times associated with differences. These correspond to loop ingress 310 and/or 312, increment 322, and loop egress 326, and they respectively add, increment, and remove integer coordinates of the input time. Ingress 310 and 312 and egress 326 transform the "type" of the time, manipulating the number of integers, whereas increment 322 retains the same time type but strictly increments the last coordinate, which corresponds to the loop index. The differential dataflow graphs the system produces each have the property that every cycle contains an increment vertex. This structure is useful for reasoning about the state of the global computation for resource scheduling using a coordination clock as discussed below regarding FIG. 4.

Differential dataflow includes the concept of logical time that is used internally by the system, whereby times are members of arbitrary lattices. Unlike time in traditional incremental dataflow, the logical times used by the system form a partial order, and the differences used in the system are not necessarily between two collections at consecutive times. In practice this more complex notion of time typically makes the sets of differences that the system stores much sparser and hence more compact than the corresponding sets of collections, especially in the presence of fixed-point loops, which often converge gradually to a fixed point and change less in later iterations. In fact, at many times no differences need be stored at all; in which case the system can skip over those times without doing any work. This ability to skip over work requires a more complex scheduling discipline than is needed for acyclic dataflow, and the efficient coordination of update processing across distributed workers is the subject of FIG. 4 and FIG. 5.

Illustrative Logical Architecture

Figure 4:
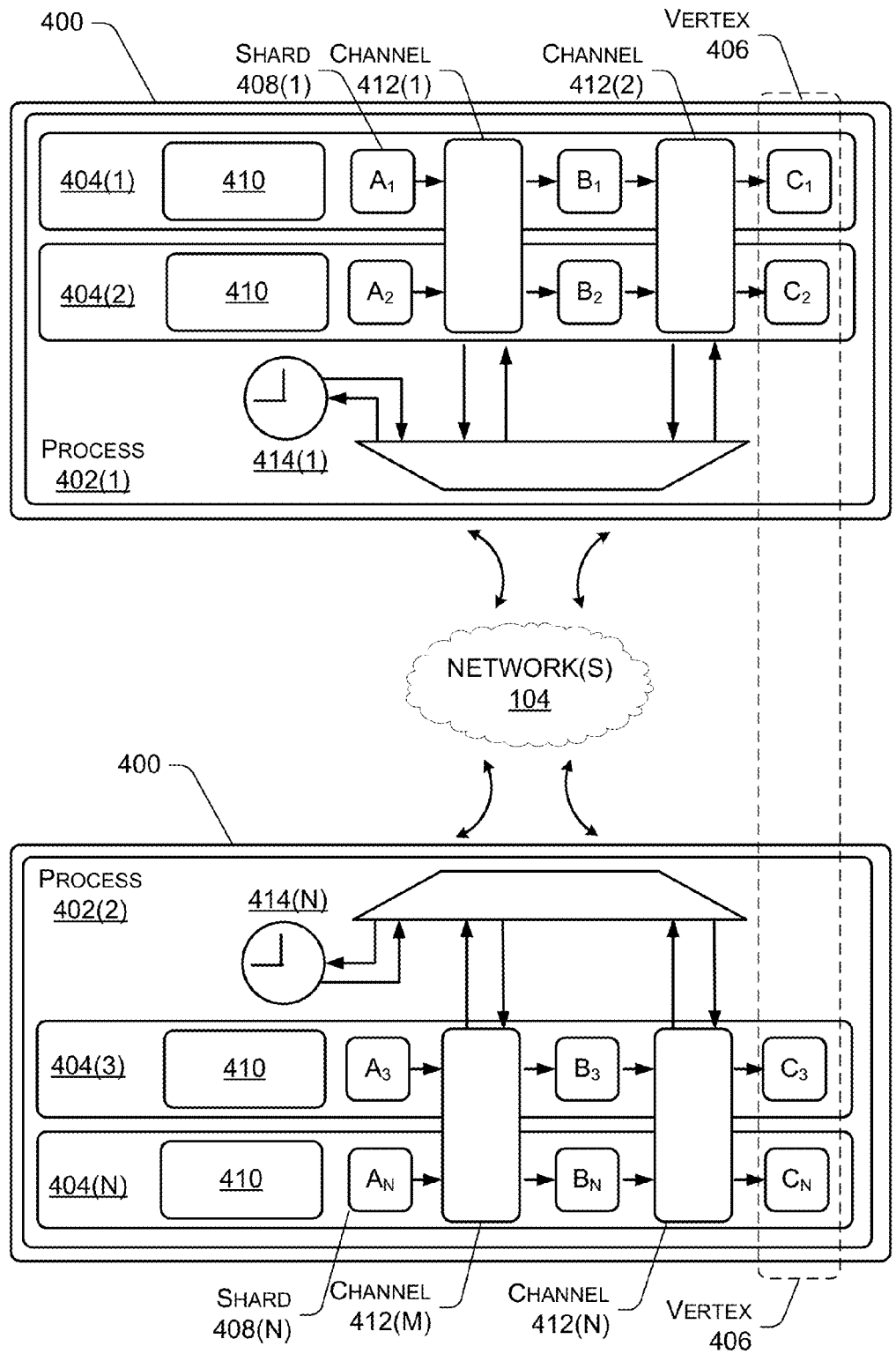
FIG. 4 is a block diagram depicting an example architecture that can perform operations of reachability-based coordination for cyclic dataflow, according to various embodiments.

FIG. 4 is a block diagram depicting an example architecture that can perform operations of reachability-based coordination for cyclic dataflow, according to various embodiments. FIG. 4 illustrates two example-computing devices 400, which can perform operations of distributed resources 102, for example as devices 106 shown in FIG. 1. Computing device 400 can include one or more processors such as processor(s) 108 that execute computer-executable, processor-executable, and/or machine-executable instructions written in any suitable programming language to perform various functions described herein.

As shown, the system maps a differential dataflow computation across example processes 402(1) and 402(2), which run on different machines in a cluster. In various implementations, the number of processes can be many orders of magnitude greater than the two illustrated. Each process contains several workers 404(1)-404(N) (typically one per processor core), which are implemented using threads. Each illustrated dataflow vertex 406 has a data-parallel implementation, which means that every difference sent to an operator can be partitioned according to some function of its record, called the key function. As mentioned above, in some embodiments, the coordination clock can manage computation where a dataflow graph can be composed vertices that are not "operators" in a functional, data-parallel sense. Each operator input can use a different key function. To achieve parallelism, the system partitions the computational state of each vertex 406 into a number of disjoint shards 408(1)-408(N), where the number is the total number of workers 404 in the cluster, and each worker is responsible for one shard of every vertex in the graph. As a result, each vertex 406 is partitioned across the entire cluster. The same shard 408 processes inputs to a vertex 406 with the same key, and the operator can independently process records that map to distinct keys. Each worker 404 contains a local scheduler 410 that independently schedules one vertex shard at a time, deciding which, if any, to schedule based on resource management policies.

When a shard 408 produces a new difference, that difference may need to be transferred to a different worker 404. Uni-directional channels 412 implement the dataflow edges. The uni-directional channels 412 are optionally ordered and connect all pairs of workers 404. Data exchange is achieved by the sender shard applying the destination key function to each output record and selecting the appropriate channel to the recipient shard. Channels between workers in two different processes are multiplexed, such as onto a TCP connection, and the techniques for reachability-based coordination for cyclic dataflow automatically generate serialization code for socket communication. Intra-process channels use typed in-memory buffers, and do not have to serialize the differences. Chains of stateless operators are fused into a pipeline of function calls.

A local coordination clock 414(1)-414(N) informs scheduling and resource management decisions for each worker. Each process has one coordination clock and multiplexes a coordination clock protocol onto the same sockets used for data exchange. In alternative embodiments, each worker has one coordination clock or an entire cluster shares a single coordination clock. In these alternative embodiments, the update protocol remains the same, and different communication mechanisms are used to disseminate the result to the workers.

The program runs in three phases: first, the communication channels 412 between workers 404 are established, for example by a library code; second, a dataflow graph, such as the one illustrated in FIG. 3, is constructed, for example by executing the call to the ConnectedComponents function in the Main function shown in FIG. 2; and then data are presented to input graph nodes. The system asynchronously triggers callbacks with the corresponding output data, and the program executes indefinitely as long as new data epochs are introduced, terminating when all inputs have been closed and the global set of outstanding differences is empty. At least one implementation uses a "single program multiple data" (SPMD) deployment strategy, in which the program constructing the graph runs on each device 400. Each worker 404 can ingress data to every input vertex 406 (an epoch is not complete until it has been closed by every worker), and the programmer loads data in an SPMD-aware manner, partitioning the data ingress and result collection across participating processes 402.

FIG. 5 is a diagram depicting an example of a reachability-based coordination for cyclic dataflow program that performs MapReduce in a fixed-point loop, and fires a callback when it is done, according to various embodiments. The cyclic dataflow program can be run on a single machine. However, in a single machine implementation, the performance may be limited by the number of independent processing cores in the single machine. Furthermore, the performance may be limited by the amount of memory in the single machine. Distributing execution of the program across a cluster of machines avoids the single machine limitations. However, distributing the execution across a cluster of machines introduces a problem of latency due to a central master process.

The system renders this program 500 into a dataflow graph 502, where each circle is an operator, and records flow along the edges. Each of the operators 508 and 510 operates as a co-routine that pulls in its inputs 504, performs a differential dataflow algorithm, and produces records as its outputs 512. In a single-machine implementation that need not employ the coordination clock, the system divides the graph into shards, for example by partitioning the key space associated with each operator, and pins each shard to a different processor core. Data exchange before GroupBy 510 is implemented using shared-memory buffers. The main loop then proceeds, in lock step, through the operators 508 and 510, repeating as appropriate, until all of the work has been completed.

To effectively use cyclic dataflow in a distributed system rather than a single machine, replacing shared-memory buffers with TCP sockets is insufficient because the workers make frequent access to global shared state. For example, consider a Boolean variable allDone, which is true if and only if all of the workers have terminated. The workers will update the allDone variable as they transition between inactive and active states, and consult the allDone variable when inactive to determine whether or not they may terminate. In contrast to other iterative MapReduce approaches such as Haloop, Twister, and Spark, which make the decision synchronously using a central master process, the system described herein avoids the latency of synchronously contacting a master on every occurrence of a worker becoming inactive, which would bound the maximum performance of a program that had very small iterations or incremental updates. Reachability-based coordination for cyclic dataflow, as described herein, makes using differential dataflow effective in a distributed system by employing asynchronous and decentralized independent scheduling of threads to achieve latencies of microseconds (e.g., 50, 200, 800, etc.) rather than seconds or minutes as in other approaches.

To achieve low latencies, the distributed system is designed as an asynchronous and decentralized system. Each thread of each worker is scheduled independently, and when a thread receives new data, this triggers computation at the receiver. To make this work, and to achieve iteration latencies of microseconds, the system employs a particular protocol for distributed termination. In addition, several resource management questions can be answered by a global view of the system. For example, there is the simple binary question of "have all workers in the cluster terminated"? However, to compute an aggregation, a worker might also want to know if it has seen all of its inputs up to time t. In addition, to compact its historical state the worker might want to know if a subset of its state is effectively "frozen," meaning the subset of the state cannot change at any point in the future.

Accordingly, the distributed termination protocol uses an indication of time, in addition to termination. As described herein the indication of time is based on the logical time described above and represented by a coordination clock, which is a replicated data structure that summarizes the remaining work to be done in a reachability-based coordination for cyclic dataflow computation. The coordination clock is described below regarding FIGS. 6A, 6B, 6C, and 6D.

Illustrative States

FIGS. 6A, 6B, 6C, and 6D are state diagrams illustrating the flow of information in a system employing a coordination clock, according to various embodiments.

Every process consults its own coordination clock 602, created by coordination clock protocol 118, to make resource management decisions. Each process adds a timestamp to records when they are produced, for example, using the notation (epoch, iteration) such that (1, 37) means that a record was produced in the $1^{st}$ epoch, $37^{th}$ iteration. Clock 602 provides a mapping entry 604 from vertex name 606 and time 608 to a count of outstanding records 610. FIG. 6 presents a program with three operators, A 612, B 614, and C 616, where B 614 and C 616 operate on the output of A 612.

Figure 6A:
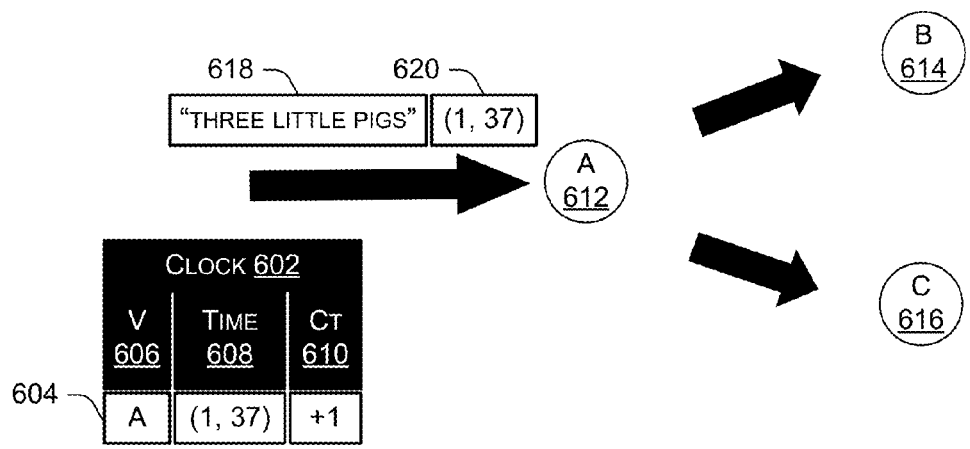
FIGS. 6A, 6B, 6C, and 6D are state diagrams illustrating the flow of information in an example system employing a coordination clock, according to various embodiments.

In the example illustrated in FIG. 6, in particular in FIG. 6A, operator A 612 receives a record 618, which is the string "three little pigs" with a version (1, 37) 620. In this initial state where the count 610 is set to +1, the clock 602 indicates there is one outstanding record for processing by a vertex 606, in this case vertex A, at a time 608, in this case time (1,37).

Figure 6B:
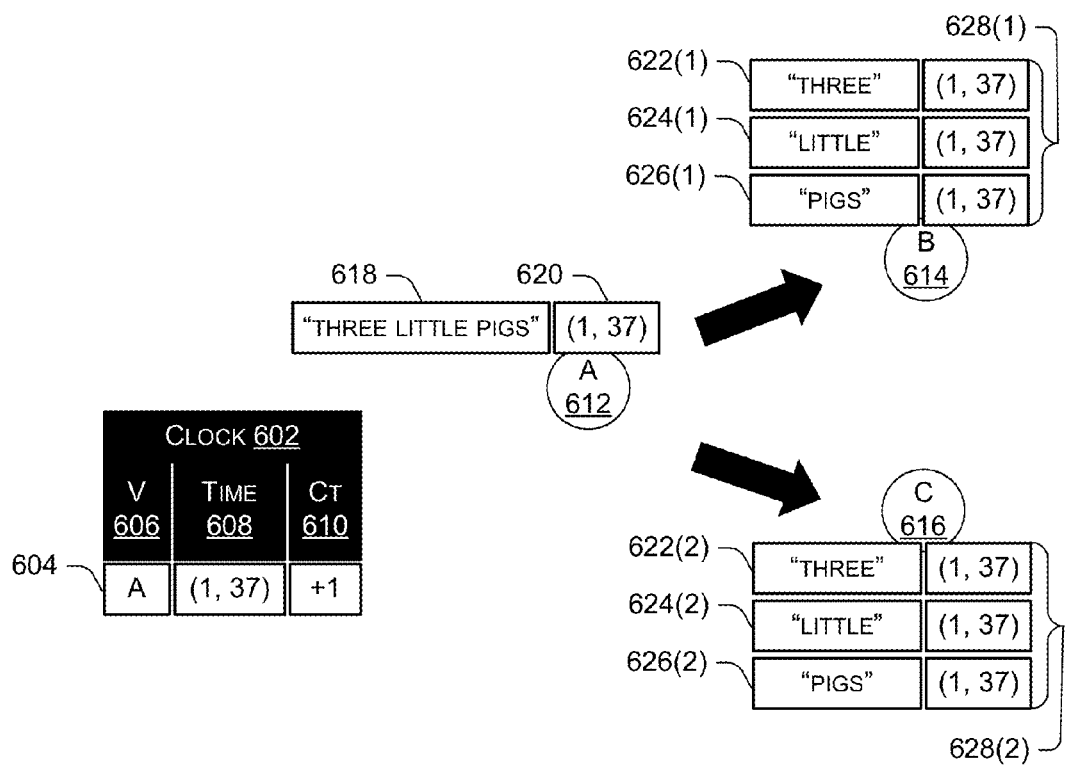

As illustrated by FIG. 6B, given that vertex A 612 performs a string tokenization function, vertex A 612 consumes the record 618 at time 620 by tokenizing the string "three little pigs" into its component words and produces three records 622, 624 and 626 each for vertex B 614 and C 616. That is, vertex A 612 produces a record of each word to pass to vertices B 614 and C 616 for operations thereon with the same version 628 in epoch 1 still in iteration 37 of this loop.

Figure 6C:
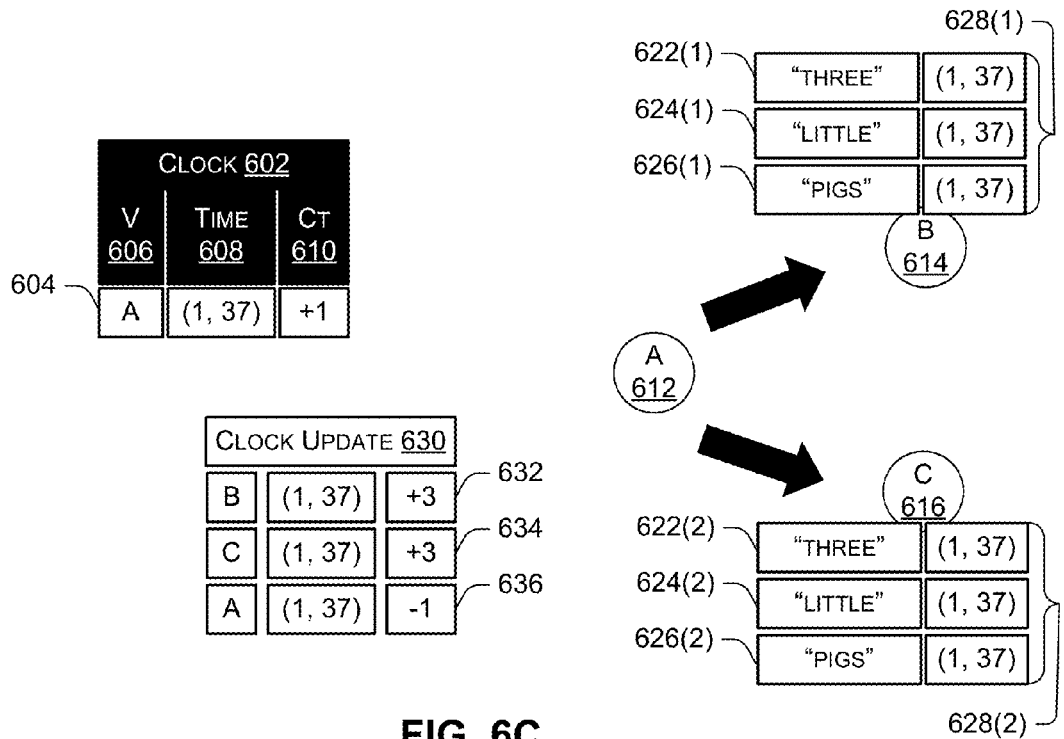

As illustrated by FIG. 6C, the clock protocol dictates that operations at vertex A 612 produce a clock update 630 summarizing the effects of processing the record 618. The clock update 630 indicates that there are now three more unprocessed records for vertex B at (1, 37) 632, three more unprocessed records for vertex C at (1, 37) 634, and 1 fewer unprocessed record for vertex A at (1, 37) 636.

Figure 6D:
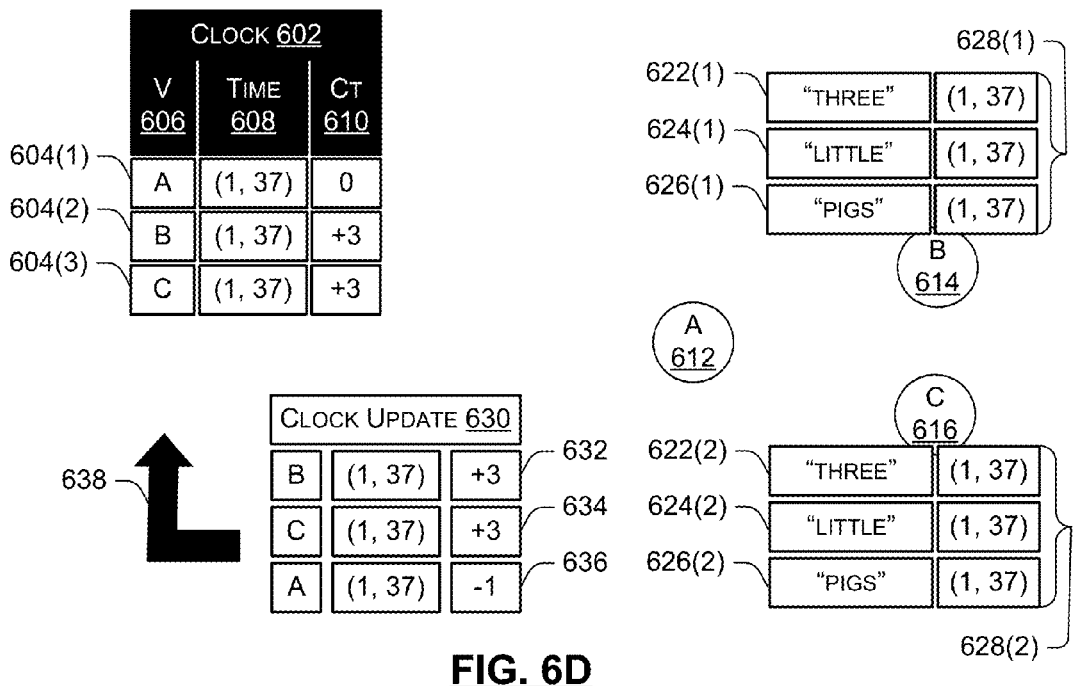

As illustrated by FIG. 6D, the system broadcasts this update to all processes for component-wise addition to their local clocks at 638. Thus, as shown for the clock 602 in the process illustrated in FIG. 6, the count 610 for entry 604(1) corresponding to vertex A at time (1, 37) has dropped to zero. Meanwhile, the count 610 for entry 604(2) corresponding to vertex B at time (1, 37) indicates +3, which means three outstanding records are available for operations at vertex B, and the count 610 for entry 604(3) corresponding to vertex C at time (1, 37) indicates +3, which means three outstanding records are also available for operations at vertex C.

While a computation is running, the "earliest" clock entries can be particularly useful. When the clock count 610 drops to zero for one of the earliest clock entries, this indicates that all the prior data for that vertex at that time is "frozen" and will not change. For example, if one of the earliest entries corresponds to an aggregation, the system can identify that all of its input has been received, and can produce the correct result. This knowledge of the graph structure allows the system to impose a causal order on the clock entries, whereby a vertex-time pair X precedes a vertex-time pair Y in the causal order if processing the records at X can cause the set of records at Y to change. The system can impose the causal order because operators never produce output at an "earlier" time than their input, and all loops strictly increase the last coordinate of the time, which represents an iteration. Thus, the system identifies when certain pairs of vertex-time, e.g., A-(1, 37), have stabilized and the system can safely terminate the process when all clock counts 610 for the vertices in the process drop to zero. In other words, the system uses the structure of the graph to determine a causal order since all of the input for an operator has arrived if there are no clock entries 604 having counts 610 that causally precede it.

Causal order also enables the system to perform garbage collection. Because stateful operators will contain many times that precede the set of earliest vertex-time pairs in the clock, and because the values stored at those vertex-time pairs are now frozen, the system can consolidate them into a single time. This saves memory and makes it possible to operate with long-running sliding windows.

Moreover, overhead is negligible, since clock updates can be batched by summing the weights associated with each time and piggybacked on message exchanges.

Figure 7A:
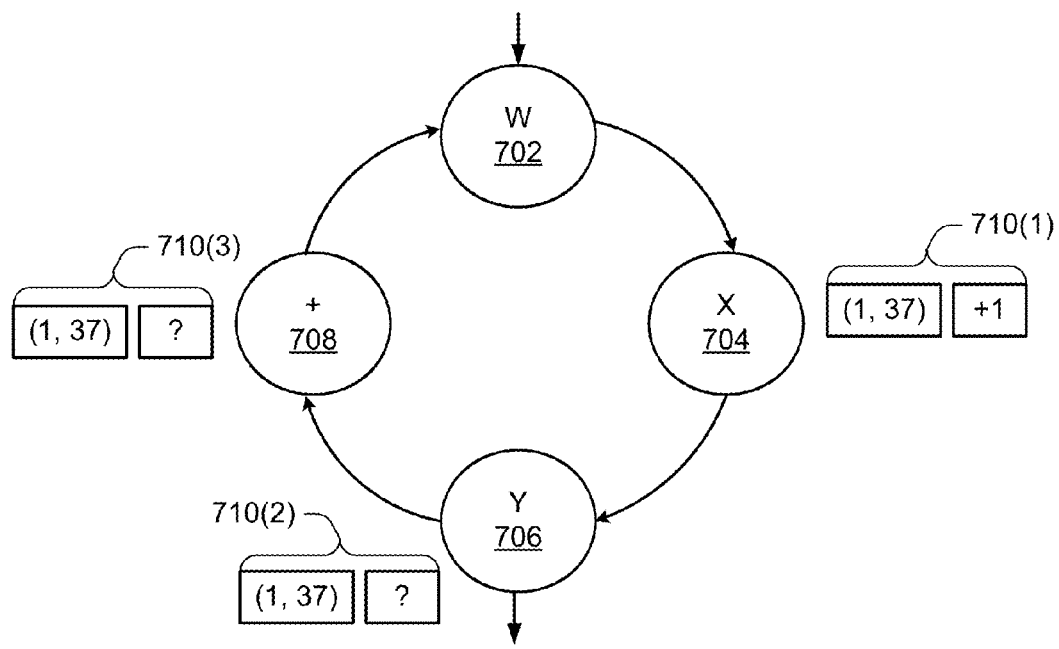
FIGS. 7A and 7B are state diagrams illustrating the flow of information in an example cyclic system employing the coordination clock, according to various embodiments.
Figure 7B:
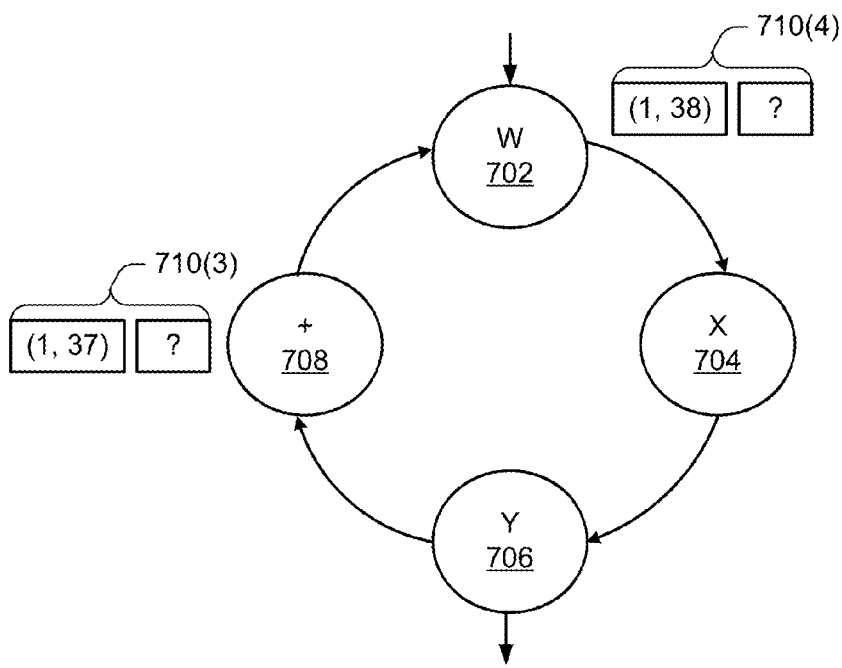

FIGS. 7A and 7B are state diagrams illustrating the flow of information in a cyclic system employing the coordination clock 602, according to various embodiments. For simplicity, we omit some of the annotations provided in FIG. 6 in order to highlight cyclic operations in FIG. 7. However, one of ordinary skill should appreciate that the same or similar processes and updating occur in FIG. 7 as occur in FIG. 6.

FIG. 7 illustrates a dataflow graph with four operators W 702, X 704, Y 706, and + 708, which are connected in a cycle. The four operators have corresponding clock entries 710, which, similar to clock entries 604 of FIG. 6, indicate outstanding work. The system can use the clock entries 710 to look forward and anticipate what the operators W 702, X 704, Y 706, and + 708 can cause to happen in the future. In particular, if there is no work outstanding that can cause a change to some subset of the data, the system can process that subset of data with the knowledge that the subset is complete.

As shown in FIG. 7A, data comes into the cycle through vertex W 702, which passes a record to operator X 704. For simplicity, a clock entry 710(1), that is time (1, 37) similar to 608 at a count similar to 610 of +1 is shown at operator X 704. The system can use the structure of the graph to figure out what changes this can possibly cause. As noted above, there are two main properties of the structure of dataflow graphs that the system relies on: 1) one of these operators never causes a version of a record to go backwards, which means for the example shown an operator would never produce (0, 37) or (1, 36) when operating on a record at time (1, 37). The versions of the records always stay the same or advance in some sense, and 2) where there is a cycle in a graph, there has to be something that causes the version to increase, so as to avoid records at the same version arriving at that operator infinitely many times. That would mean that X could cause a change to itself and would never process the change.

As shown in FIG. 7A, an outstanding record signified by the count +1 at time (1, 37) in entry 710(1) for operator X 704 can cause some number of records 610 for operator Y 706 at time no earlier than (1, 37) as shown in entry 710(2), and likewise some number of records 610 for operator + 708 at time no earlier than (1, 37) as shown in entry 710(3) and as denoted by the "?" shown in count 710(2) and 710(3), respectively.

Because the vertices W, X, Y, and + form a cycle, the system must introduce a vertex that causes records that traverse the whole cycle to advance in the causal order. Thus, for a cycle, the system creates a special operator that increases the version, and in the cycle the special vertex "+" increments the iteration number.

As shown in FIG. 7B, vertex + 708 causes the iteration number to increment at W 702. This means at W 702, the entry 710(4) indicates the earliest time 608 that will be produced is (1, 38). Although the count 610 at that vertex is not yet known as signified by the "?", the "+" operator 708 increments the last coordinate of records that pass through it, which is the number of iterations in the loop. W 702 may also produce records for X 704 at time no earlier than (1, 38), but since that is later than the earliest record at X 704 (cf. clock entry 710(1)), the system need not take note of this fact, which terminates the propagation. The system, having determined the clock entries 710, can identify that they form a partial order, which represents reachability.

Figure 8:
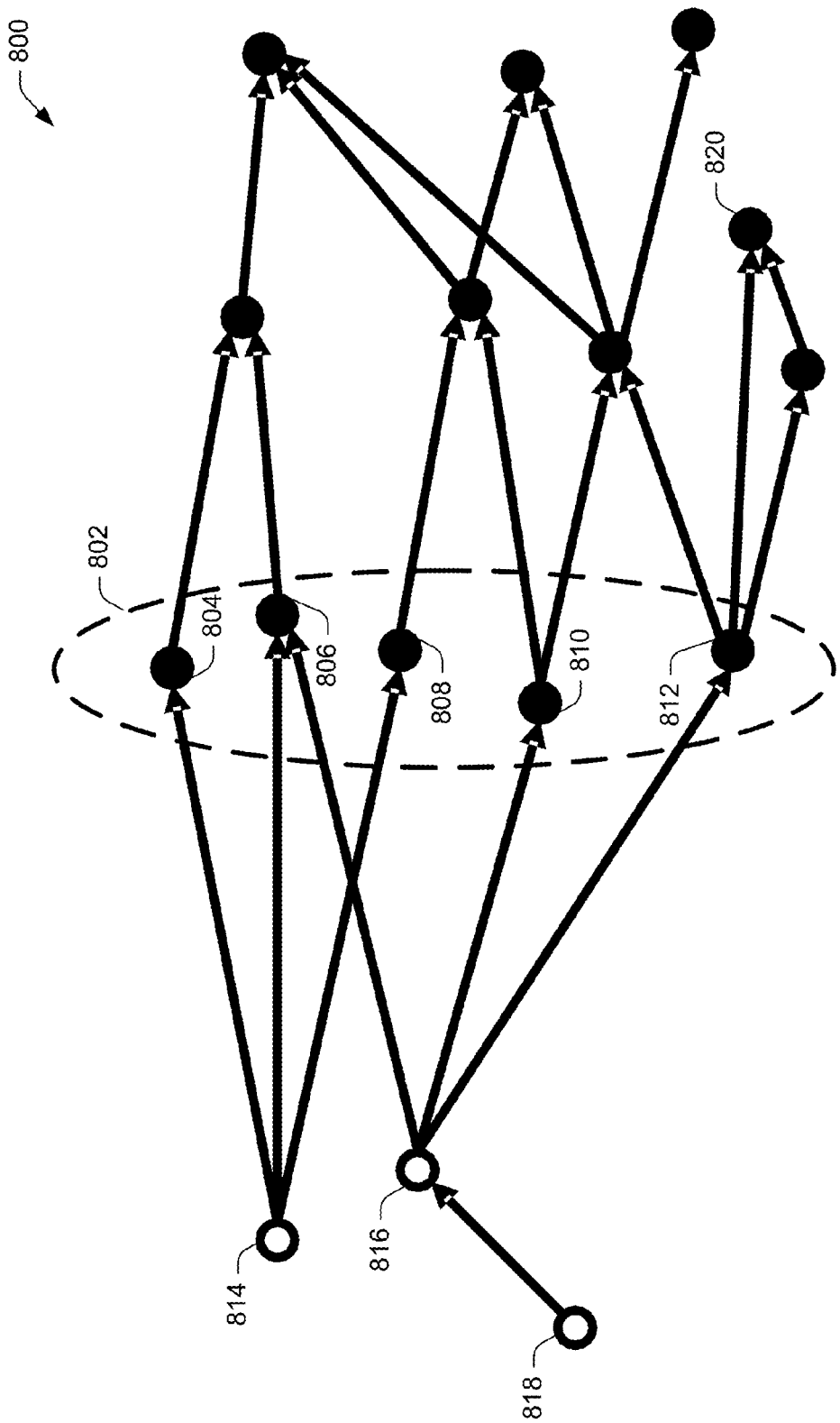
FIG. 8 is a diagram depicting an example application of the coordination clock to identify runnable work, according to various embodiments.

FIG. 8 is a diagram depicting an example application of the coordination clock protocol 118 to identify runnable work, according to various embodiments.

At 800, each of the dots represents one or more records in the system at the same vertex-time pair. The black dots represent outstanding records, those for which work is still to be done, and the white dots represent completed work, that is records that were previously processed and are now "frozen." The dashed line 802 encircles a set of "minimal" vertex-time pairs, which represent the operators that have all of their inputs up to a particular time. These minimal times, sometimes called a minimal antichain, include dataflow operators that have no active predecessor dataflow operators. These are the front line of runnable work, and the system can run these operators with the knowledge that they will produce the correct output. From the dataflow graph built using the coordination clock protocol 118 to obtain known and anticipated future operations as discussed regarding FIG. 6 and FIG. 7, the system can infer the currently outstanding work and possible future outstanding work. The system can make this inference because of the structure of the graph and the properties of never going back in time and always strictly increasing when going round a loop.

As shown at 800, in this dependency graph there is a partial order and no cycles. The arrows represent a directed acyclic graph, the acyclicity of which insures that there is at least one minimal element—an element that has no predecessor in this set of work. In the example illustrated at 800, the dashed line 802 encircles five minimal elements, 804, 806, 808, 810, and 812, which are bits of work where the system has determined all of the data is on hand and therefore the system can choose one of those five pieces of work to execute with the full knowledge that the operation will be correct. This provides a scheduling algorithm to arrange the outstanding work into this graph structure, to identify a set of minimal elements, and to choose to operate from that set.

The system provides for at least two variants depending on whether reduced latency or high throughput drives the system. For example, a dataflow graph as shown at 800, could have many different versions going through the graph. The system can be set to execute entries that are later in the graph on earlier versions of the input, which means the results are returned for those entries as soon as possible (low latency). Or, the system can be set to execute entries that are earlier in the graph for newer versions of the input, which can insure there will be more work to do on each of these vertices and therefore result in a higher throughput.

In some embodiments, the elements to the right of the dashed line can be transiently represented with a negative count due to processing out of order. An element being represented with a negative count indicates that there is certainly additional work to do by that element. However, the element within the dashed line will not be represented with a negative count because they will never receive another input to increase their count to zero.

A third application of reachability-based coordination for cyclic dataflow is garbage collection and compaction. As a program executes, the dots may change—some may disappear and new ones may appear. The white dots 814, 816, and 818 represent elements that have disappeared, that precede the front line of runnable work, and that represent the causal past. These white dots represent entries 604 that have existed at some point in the execution of the computation. There may be some data values associated with them, represented by some state within some operators. However, the system has identified that these entries are now frozen and will never change. Responsive to identifying this, the system can, with no negative effect on subsequent results, compact those entries down to exist at a single version. For example, when the system is running on version 100 of the inputs, the distinctions between versions that can no longer change are no longer important, and the system can retain a single compacted representation of all those frozen versions.

Considering the phrase division example from FIG. 6, the "three little pigs" example, if the input is part of a program that is counting the number of words, at version one of the input the system may have seen the word "three" 100 times, at version two the system may have seen the word "three" 50 more times, and at version three, the system may have seen the word "three" twice more. Previously, each of the three version counts would be stored as a separate record in memory. Given that these three entries are frozen, the system can replace them with a single entry for the word "three" having a count of +152. This reduces the amount of memory to represent the word "three" in the program to one-third of the previous representation.

The system can use the information in the clock to identify a set of times at which the state in a particular operator might change, so starting with some outstanding work, say the system is monitoring the state at element 820, and say element 820 represents vertex W from FIG. 7 while element 812 represents vertex X from FIG. 7. The system knows from having the piece of outstanding work +1 at vertex X, that the earliest change at W will be (1,38). There may be multiple such times coming in via different routes through the graph. The compaction application presents that time, (1, 38) to W, which controls the earliest time W can change. The system examines all of the known times and based on the resulting count determines whether or not to advance the entries to a future time to compact. The system can compact when multiple frozen times can be advanced to the same future time. Thus, as discussed regarding the "three little pigs" example above, the system can consider all of the entries that have a count zero associated with those times add the weights of those entries together. A particularly advantageous situation occurs when the system recognizes a +1 count for an entry at time T1 and a −1 count for the same entry at time T2. In that situation, the system can advance both T1 and T2 to T3, the weights cancel out, (+1)+(−1)=0 and the system can delete that entry.

However, due to differential dataflow, not all preceding records can be compacted. Suppose that the record changes at each of 5 iterations of batch 1 and the record changes in the first 4 iterations of batch 2. When there is a change in iteration 4 of batch 2, the system needs to use all of the versions 1-3 of batch 2 and 1-4 of batch 1 to ascertain what computation to do in the $4^{th}$ iteration of batch 2. Thus, the system does not compact iteration 1, 2, and 3 of batch 2, because it will use their values at iteration 4 of batch 2. However, when the system reaches iteration 4 of batch 3, while it needs to use the values from versions 1-4 of batch 2 and the values from versions 1-4 of batch 1 to ascertain what computation to do, some subsets of the values from versions 1-4 of batch 2 and from versions 1-4 of batch 1 can be compacted to minimize memory and processing. Moreover, the system may identify that there is no work to be done until the $4^{th}$ iteration of the $3^{rd}$ batch. That is, the $1^{st}$ through $3^{rd}$ iterations of the $3^{rd}$ batch do not require any processing. By maintaining the distinction between the records for the $1^{st}$ through $3^{rd}$ iterations of the $3^{rd}$ batch and the preceding records, although some of the preceding records can be compacted, the system can identify that no work needs to be done for those iterations.

If there are no times at which a collection can change, then the collection will never be visited again in the course of the computation and the system can discard all of the state of the frozen collection. Thus, for example, the system has identified that all of the work has moved on to a later stage of the graph and has identified that no more data will ever flow through vertex 814, so the system can shut vertex 814 down completely for garbage collection.

In various embodiments, the system employs a product lattice, which is defined by a tuple of integers, e.g., $(0, 3) < (7, 7)$ and $(3, 0) < (7, 7)$, but none of $(0, 3) < (3, 0)$, $(3, 0) < (0, 3)$, or $(3, 0) = (0, 3)$ is true. Say for example, the data state is $(1, 8)$, and information is received that possible times the data can change are $(4, 20)$ and $(7, 6)$. The times $(4, 20)$ and $(7, 6)$ are reachable. In various embodiments, the reachable times are seeded by the coordination clock protocol 118. For each data item, the system takes the least upper bound of the times in the data state and in the reachable sets. Accordingly, the system compares each state coordinate to each corresponding reachable coordinate to ascertain which is less by taking the maximum of each position in the tuple. Thus, comparing the data state coordinates $(1, 8)$ to the reachable coordinates $(4, 20)$, the resulting least upper bound is $(4, 20)$ since $4>1$ and $20>8$. Next, comparing the data state coordinates $(1, 8)$ to the reachable coordinates $(7, 6)$, the resulting least upper bound is $(7, 8)$ since $7>1$ and $8>6$. Accordingly, the system can identify the state joined to the reachable times by the least upper bounds $(4, 20)$ and $(7, 8)$. The least upper bounds can be combined to obtain the greatest lower bound by taking the minimum of each position in the tuple. Thus, comparing the least upper bounds $(4, 20)$ and $(7, 8)$, the resulting greatest lower bound is $(4, 8)$ since $4<7$ and $8<20$. Based on these calculations, the system can advance state $(1, 8)$ to $(4, 8)$.

In addition, given a second data state, $(2, 8)$, the system can perform calculations as set forth above and determine that the first data state $(1, 8)$ and the second data state, $(2, 8)$ would both result in the greatest lower bound is $(4, 8)$. This indicates that the first and second data states can be compacted together. However, given a third data state, $(6, 8)$, that third data state needs to be distinguished and cannot be compacted. In principle this is because changes can still be occurring at reachable time $(4, 20)$, meaning there can be changes in the $4^{th}$ version. Accordingly, even though the third data state, $(6, 8)$, represents the $6^{th}$ version, it could still change because the inputs can arrive out of order from different versions. Compaction while some states may need to be distinguished is particularly useful when operating a sliding window of times across a dataset. For example, as a thirty-day window proceeds to collect new data and disregard stale data, the stale data, from the days no longer within the window can be compacted although their key remains until all values associated therewith go to zero.

Illustrative States

Figure 9:
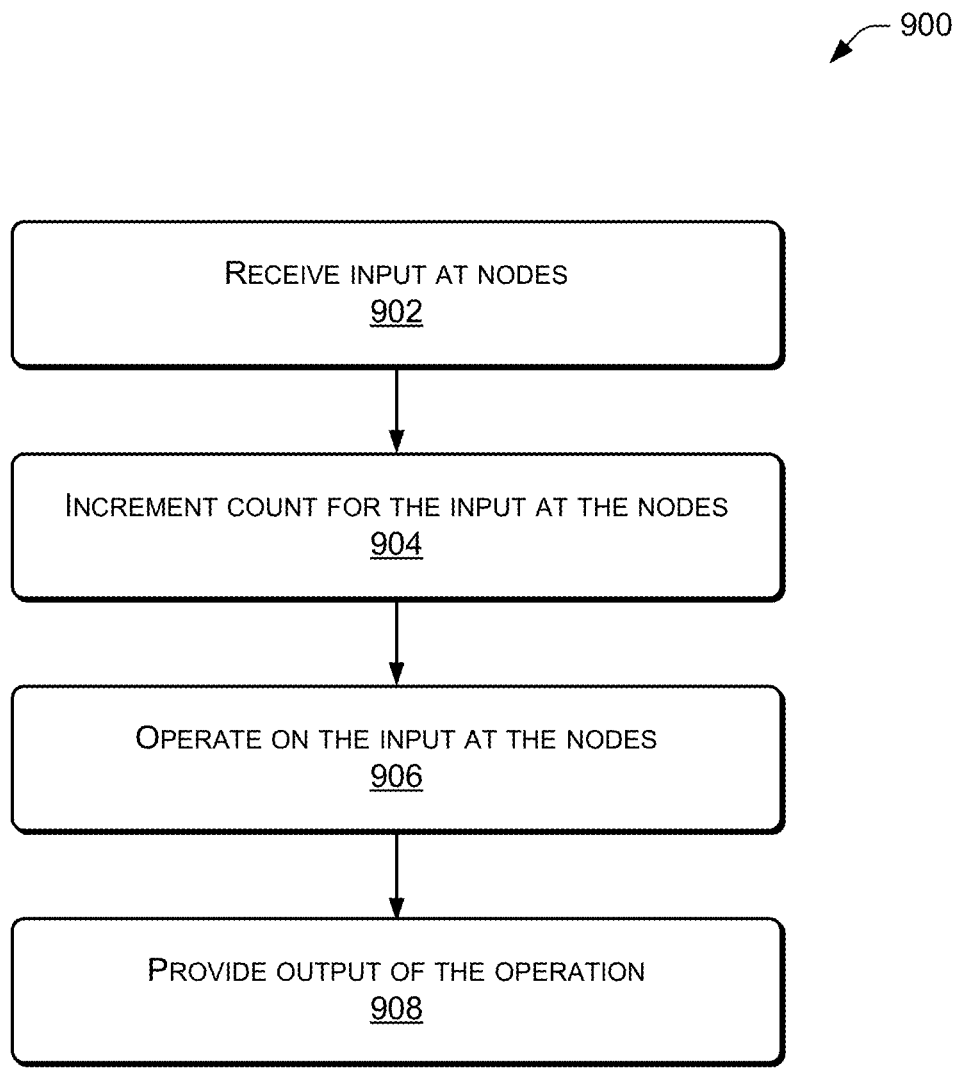
FIG. 9 is a flowchart illustrating an example process for reachability-based coordination for cyclic dataflow, according to various embodiments.

FIG. 9 is a flow diagram depicting an example processes for reachability-based coordination for cyclic dataflow. The first operations of the example process are illustrated in individual blocks and summarized with reference to those blocks. The process is illustrated as logical flows of blocks, each block of which can represent one or more operations that can be implemented in hardware, software, or a combination thereof. In the context of software, the first operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular abstract data types. The order in which the first operations are described is not intended to be construed as a limitation, and any number of the described operations can be executed in any order, combined in any order, subdivided into multiple sub-operations, and/or executed in parallel to implement the described process.

In the example shown in FIG. 9, process 900 includes operations performed by worker nodes in one or more device(s) 106.

At 902, the worker nodes receive input. For example, if the system is operating on a large-scale collection of data pertaining to a real world system, such as a social network system like TWITTER, the input can represent the tweets for a twenty-four hour period, which can comprise information about over two million users. As another example, if the system is operating on a large-scale collection of data pertaining to a real world system, such as a global positioning system (GPS), the workers can store a road network with information about the length of each segment of road and the endpoints that the road connects. In this example, streaming data can include a number of samples from GPS receivers that indicate how long (in present traffic) it takes to travel down a segment of road.

Unlike other approaches to parallel computation, each node receives a discrete slice or shard of the data input rather than receiving a copy of the data input that is also received, at least in part by other nodes.

At 904, the system increments a count for each node as it receives the units of data input. For example, given the TWITTER data, information about the set of trending topics, the most popular topics being discussed at a certain time may be useful. The count can increment for each hashtag received as input. In the GPS example, the count can increment for each GPS reading from a road segment received as input.

At 906, the nodes operate on the input. In the case of the TWITTER data, for example, the topics from a 30-minute window can be ranked by number of tweets. In the GPS example, the system can calculate the fastest route between two endpoints using an iterative algorithm such as all-pairs shortest paths. Receiving new GPS readings may cause the estimated time to travel down a road segment to change. The system can take the new estimates into account and compute updated optimal routes between source and destination pairs.

At 908, the nodes provide output of the operation. For example, the top 10 TWITTER topics from the 30-minute window can be output, and in some instances displayed. In the GPS example, an optimal route between a source and destination pair can be output, and in some instances displayed.

Thus, the system can demonstrate how such a list and the corresponding counts evolve over time. This sliding window uses reachability-based coordination for cyclic dataflow's ability to add and remove records and a graphical user interface (GUI) can update a set of "active seconds" and send those into the computation. In the TWITTER example, the system can join these with the tweet timestamps to make a set of "active tweets," which can form the input to an incremental MapReduce-style computation. In addition, the system can compute the strongly connected components (SCCs) of a graph using a doubly-nested iterative algorithm. In the TWITTER example, the system can compute the SCCs of the mention graph, where an edge is formed from a first person to a second person if the first person tweets something "at" the second person, or re-tweets one of the second person's posts.

Reachability-based coordination for cyclic dataflow is a compelling tool for interactive data analysis. For example, if a sliding window over the TWITTER mention graph moves forward by one second, existing iterative approaches would re-evaluate each component all over again and waste a lot of time re-computing things that have not changed resulting in millions of changed records. In contrast, the techniques described herein provide for the composition of incremental and iterative computations, making it possible to move the sliding window forward and to obtain an accurate evaluation while changing less than 100 records in the sample dataset.

In at least one implementation, the second example can represent an internet service that provides driving directions to users. At least one embodiment of such a service incorporates a road network that is stored as a directed graph where the edges represent segments of road annotated with their distances and other metadata such as speed limits, road class, toll prices, etc. The vertices in this graph represent endpoints of the road segments. The endpoints could be the ends of the roads covered by the road network and/or junctions between two or more segments, which are annotated with their latitude, longitude and in some instances other metadata. The shortest route between any two points in this road network can be determined by pre-calculating the shortest paths between all pairs of locations in the network, using a cyclic dataflow program that executes multiple instances of an algorithm to compute single-source shortest path in a weighted directed graph such as the Bellman-Ford algorithm, another variation of the Dijkstra algorithm modified to address negative edge weights, or another such algorithm. The initial computation of these paths on a large road network is computationally intensive and produces a large amount of state, which can be produced using a dataflow program that is similar to FIG. 3, where additional information is kept regarding the lengths of edges and the predecessor in each path. Responsive to execution of the computation, the state of the computation can be stored in a distributed cluster of computers in a data center.

Having computed that state, it would be useful to update the computed routes to reflect real-time information about traffic conditions. A network of sensors, such as mobile devices having GPS receivers, can record the time taken to travel along a road segment in the prevailing conditions and send this data to the data center using a network such as the cellular telephone network or a nearby wifi network.

In the data center, a data aggregation component, which may be a pre-loop node in a cyclic data flow graph, can combine the readings from a plurality of GPS-equipped sensors to update the estimated time taken to travel along a road segment.

The updated estimates may change the optimal route between one or more source-destination pairs, for example to route around heavy traffic in a particular location. The system executing the cyclic dataflow graph can use differential dataflow techniques as described in co-pending and commonly assigned application Ser. No. 13/468,726, entitled "Differential Dataflow" to determine a reduced set of changes to the state for communication between multiple processes in the cluster.

Reachability-based coordination ensures that all processes can detect when a new version of the state has converged based on the updated estimates. Reachability-based coordination provides for the changes, which may occur in a large number of iterations requiring several rounds of coordination, to propagate through the cluster in a short period of time. Reachability-based coordination can also be used to coalesce the previous version of the state with the updated version based on the new estimates, which allows a large volume of new estimates to be added to the system, without the memory consumption of the program growing over time.

Reachability-based coordination for cyclic dataflow is useful for a multitude of long-running streaming/sliding-window computations in which old data eventually can be compacted. In an interactive setting, reachability-based coordination is used for scheduling, and compacts some state that is generated for previous settings of the GUI controls, although reachability-based coordination for cyclic dataflow can also keep the state outside the sliding window resident in memory so that it can be queried interactively.

Illustrative States

Although the techniques have been described in language specific to structural features and/or methodological acts, it is to be understood that the appended claims are not necessarily limited to the features or acts described. Rather, the features and acts are described as example implementations of such techniques.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A computer-readable storage medium storing computer-executable instructions that, when executed by a processor, configure the processor to perform operations comprising:
   scheduling a plurality of threads to operate independently on a plurality of partitions of data, wherein the plurality of threads includes a first thread and a second thread, and wherein the plurality of partitions includes a first partition and a second partition;
   beginning a first operation on the first partition by the first thread;
   beginning the first operation on the second partition by the second thread;
   tracking progress of the first operation by the first thread using a replicated data structure;
   tracking progress of the first operation by the second thread using the replicated data structure;
   for a record on which the first operation is to be performed, adding an entry to the replicated data structure, wherein the entry includes a timestamp, and wherein the timestamp indicates an epoch and an iteration at which the record was produced;
   determining a number of yet-to-be-processed records for a selected entry of the replicated data structure, wherein the selected entry has a most recent timestamp for the first thread; and
   in response to the number of yet-to-be-processed records for the selected entry being zero, terminating the first thread.

2. The computer-readable storage medium of claim 1, further comprising:
   determining a number of yet-to-be-processed records for a second selected entry of the replicated data structure, wherein the second selected entry has a most recent timestamp for the second thread; and
   in response to the number of yet-to-be-processed records for the second selected entry being zero, terminating the second thread.

3. The computer-readable storage medium of claim 1, wherein the timestamp is a tuple made up of an integer representing the epoch and an integer representing the iteration.

4. The computer-readable storage medium of claim 1, wherein the entry includes the timestamp, a thread identifier, and a record count.

5. The computer-readable storage medium of claim 1, wherein each entry of the replicated data structure indicates a corresponding number of yet-to-be-processed records.

6. A method comprising:
   tracking progress of a computation by:
      associating each of a plurality of data items to be processed in a computation with a dataflow vertex of a dataflow graph, wherein the dataflow vertex corresponds to an output of a first function and an input of a second function;
      for each data item of the plurality of data items to be processed in the computation, associating the data item with a timestamp that indicates a time at which the data item was created in the computation;
      for each data item of the plurality of data items, storing a vertex-time pair that comprises the timestamp and an indication of the dataflow vertex; and
      for each vertex-time pair, determining a number of yet-to-be-processed data items; and
   communicating by at least one processor sending one or more messages including the number of yet-to-be-processed data items that is associated with at least one of the vertex-time pairs.

7. The method of claim 6, wherein a data item of the plurality of data items includes a record and the dataflow vertex of the dataflow graph includes a dataflow operator.

8. The method of claim 6, wherein determining the number of yet-to-be-processed data items includes:
   responsive to a data item of the plurality of data items being consumed by a first dataflow vertex, subtracting one from the number of yet-to-be-processed data items for the first dataflow vertex; and
   responsive to a data item of the plurality of data items being produced for the first dataflow vertex, adding one to the number of yet-to-be-processed data items for the first dataflow vertex.

9. The method of claim 8, further comprising maintaining, by two or more processors that communicate by passing messages across a network, multiple replicas of the vertex-time pairs associated with the number of yet-to-be-processed data items for that dataflow graph.

10. The method of claim 9, further comprising maintaining, by each processor of the two or more processors, a replica of the vertex-time pairs associated with the number of yet-to-be-processed data items for that dataflow graph that does not under-approximate an actual number of yet-to-be-processed data items for that dataflow graph.

11. The method of claim 10, wherein the vertex-time pairs are ordered according to joint precedence of operators in the dataflow graph and times in a lattice of logical timestamps.

12. The method of claim 6, wherein, for each data item, the timestamp is a tuple made up of an integer representing an epoch in which the data item was created and an integer representing an iteration in which the data item was created.

13. The method of claim 6, wherein, for each data item, the timestamp further encodes at least one of priority information and security information.

14. A system comprising:
   a plurality of processors connected to a network and configured to send messages over the network; and
   a plurality of memories storing data comprising:
      a graph of a set of dataflow operators;
      a queue of unprocessed records associated with a first dataflow operator of the set of dataflow operators, wherein each of the unprocessed records is associated with a timestamp; and
      a mapping from a version to an over-approximation of a number of unprocessed records for that version in the system,
      wherein the version indicates a dataflow operator and a timestamp, and
      wherein at least one processor of the plurality of processors communicates the number of unprocessed records over the network.

15. The system of claim 14, wherein the plurality of memories stores instructions including determining, based on a causal order of versions, a next action to take as one of:

executing the dataflow operator corresponding to the version in a clock; and blocking until a message is received.

16. The system of claim 15, wherein the plurality of memories stores instructions including:

determining a set of one or more versions to form a minimal antichain in the causal order; and drawing a next dataflow operator to execute from the set of one or more versions.

17. The system of claim 16, wherein the minimal antichain includes dataflow operators that have no active predecessor dataflow operators.

18. The system of claim 15, wherein the plurality of memories stores instructions including determining parts of computation state that will no longer change based on the causal order of versions.

19. The system of claim 18, wherein the plurality of memories stores instructions including compacting the computation state, by removing distinctions between equivalent logical times, based on the parts of the computation state that will no longer change.

20. The system of claim 19, wherein removing distinctions between equivalent logical times includes consolidating multiple copies of a processed record into a single processed record with an integer weight, and cancelling additions and subtractions of the processed record.

* * * * *